May 23, 1972          E. WIGSTOL          3,664,815
PURIFICATION OF ORGANIC SOLVENTS CONTAINING
METALS BY PEROXIDE WASH
Filed Dec. 12, 1969

INVENTOR.
EIVIND WIGSTØL

BY *Maybee & Legris*

ATTORNEYS

United States Patent Office
3,664,815
Patented May 23, 1972

3,664,815
PURIFICATION OF ORGANIC SOLVENTS CONTAINING METALS BY PEROXIDE WASH
Eivind Wigstol, Kristiansand-S, Norway, assignor to Falconbridge Nickel Mines Limited, Toronto, Ontario, Canada
Filed Dec. 12, 1969, Ser. No. 884,406
Int. Cl. B01d 11/04; C01g 3/04
U.S. Cl. 23—312 R
7 Claims

ABSTRACT OF THE DISCLOSURE

A method for the removal of residual metals, such as copper, from fouled organic solvents, such as amines, which are used in solvent extraction processes, in which the metal-containing amine is contacted with an aqueous stripping solution containing dilute concentrations of a soluble peroxide.

BACKGROUND OF THE INVENTION

The invention relates to the general field of solvent extraction, more particularly to the purification of fouled organic solvents used for the extraction of metals from aqueous solutions, and specifically to the regeneration of fouled amines containing copper extracted from acidic aqueous chloride solutions.

In solvent extraction processes in which the solvent is cycled in sequence through extraction and stripping, i.e. back extraction, operations, the effective capacity of the solvent is less than the maximum if any extracted ions remain unstripped and are returned therein to the extraction operations. Furthermore since there is an equilibrium distribution of any metal between an organic solvent and an aqueous solution in contact, it is clear that the higher the concentration of a metal in the solvent, the higher the concentration of that same metal in the aqueous solution. Thus it is readily understood that to extract substantially all of a metal from an aqueous solution, the solvent entering a counter-current solvent extraction system with that aqueous solution should also be substantially devoid of the particular metal in question. Conversely, if the concentration of residual metals in the solvent is allowed to increase with continual cycling thereof, it is clear that the efficiency of the solvent for extraction of those metals will be correspondingly decreased. Such is the case with the extraction of copper from acidic aqueous chloride solutions into amines when stripping is done with water or dilute aqueous chloride solutions.

To illustrate the nature of the problem to which the present invention is directed, reference is made to U.S. Pat. No. 3,085,054 in which a process is described for the recovery of nickel from copper-nickel matte. The matte is finely divided and leached in hydrochloric acid solution to dissolve nickel preferentially with respect to copper thereby producing an acidic nickel chloride solution and an insoluble copper sulphide residue. The nickel chloride solution contains some copper and also small concentrations of other metals present in the matte such as iron, cobalt, lead and zinc. To purify this solution prior to recovery of the nickel chloride therefrom, the solution is first contacted with oxygen or chlorine to oxidize iron, cobalt and copper to their highest oxidation (-ic) states in which form they exist in the acidic solution as anionic chloride complexes. In this form the iron is removed from solutions by solvent extraction in tributyl phosphate (TBP), and subsequently the cobalt and copper are extracted together in tri-iso-octylamine (TIOA). In addition to cobalt and copper the TIOA also picks up iron not extracted in the TBP circuit and also some zinc. The TIOA is then contacted with water to strip the extracted metals therefrom and the stripped TIOA is then recycled for extraction of further quantities of cobalt and copper from the nickel chloride leach solution.

It can happen that not all the extracted metal is stripped from TIOA and that residual concentrations of copper, iron and zinc circulate therein and increase with each cycle thereby continually decreasing the extraction efficiency of the TIOA with respect to copper, iron and zinc.

Past efforts to remove residual metals from the TIOA, particularly copper, have been unsuccessful. For example some residual iron was stripped by washing of the TIOA with water but the pickup of zinc was only arrested and removal of copper was negligible. Some copper was stripped by caustic but iron remained in the TIOA and a bulky slime precipitate was formed that was difficult to filter. This precipitate was dissolved in HCl but both the HCl and NaOH were consumed and the treatment was therefore not only incomplete but costly. Nitric acid alone was ineffective in cleaning the TIOA because metal nitrates were extracted thereby and were stripped only by contacting the TIOA with a base such as caustic, another costly procedure.

Thus there has not been until now any practical means to purify TIOA fouled by residual copper and other metals. The same applies to other amines that will extract copper from acidic aqueous chloride solutions as anionic chloride complexes.

It has now been found that the concentrations of residual copper and other metals in the amine after stripping can be made negligible when the amine is contacted with an aqueous solution containing dilute concentrations of a soluble peroxide.

SUMMARY

In a cyclic solvent extraction process for treating an acidic metal-bearing aqueous chloride solution containing copper anionic chloride complex for removal of copper therefrom comprising bringing the solution into contact with an amine solvent for copper anionic chloride complex dissolved in a substantially water-immiscible organic carrier liquid, extracting copper into the solvent, separating the organic liquid and aqueous solution, bringing copper-bearing solvent into contact with one or more aqueous stripping solutions, stripping copper into the solutions thereby depleting the solvent of copper, separating the organic liquid from each stripping solution in turn, and reusing the copper-depleted solvent for treating fresh quantities of the acidic metal-bearing aqueous chloride solution, the present invention stated broadly comprises bringing the copper-bearing solvent into contact with an aqueous stripping solution containing a soluble peroxide thereby removing copper from the solvent and controlling accumulation of residual copper therein.

By this means the solvent can be substantially completely depleted of copper when a water-soluble peroxide comprises part of an aqueous stripping solution.

The object of this invention is to provide means to purify fouled organic solvents used in the solvent extraction of metals from aqueous solution, specifically amines fouled with copper.

Other objects and advantages of the invention will be apparent from the following description taken in conjunction with the accompanying drawings.

DESCRIPTION OF THE PREFERRED EMBODIMENT

Figure 1:
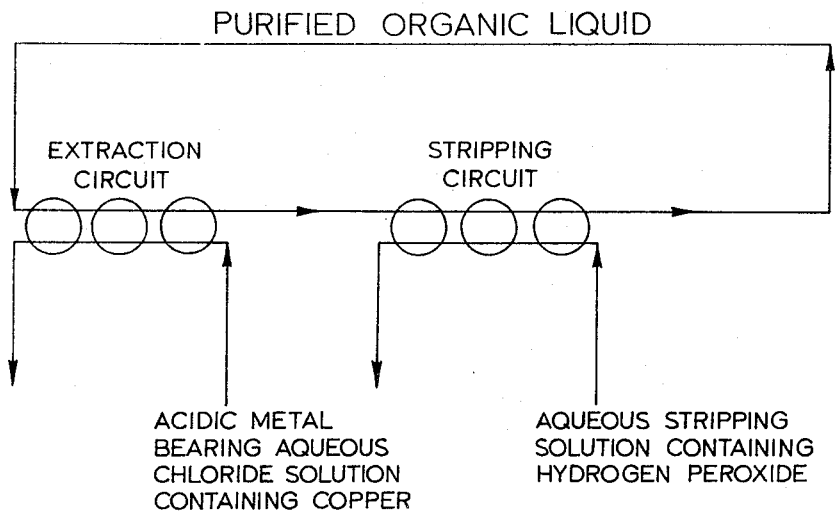
FIG. 1 is a flowsheet of a solvent extraction process in which an embodiment of the present invention is carried out.

FIG. 1 illustrates, by way of a flowsheet, an embodiment of the present invention in a conventional multistage counter-current solvent extraction system. An acidic metal-bearing aqueous chloride solution containing copper as anionic chloride complex is brought into contact in a three-stage counter-current extraction circuit with an amine solvent for copper anionic chloride complex dissolved in a substantially water-immiscible organic carrier liquid. The copper is extracted into the amine and the organic liquid containing the amine is then separated from the aqueous solution. The copper-bearing organic liquid is then brought into contact in a three-stage counter-current stripping circuit with an aqueous stripping solution having hydrogen peroxide dissolved therein. The copper is stripped into the stripping solution and the resulting substantially copper-free organic liquid is separated therefrom and returned to the extraction circuit.

Figure 2:
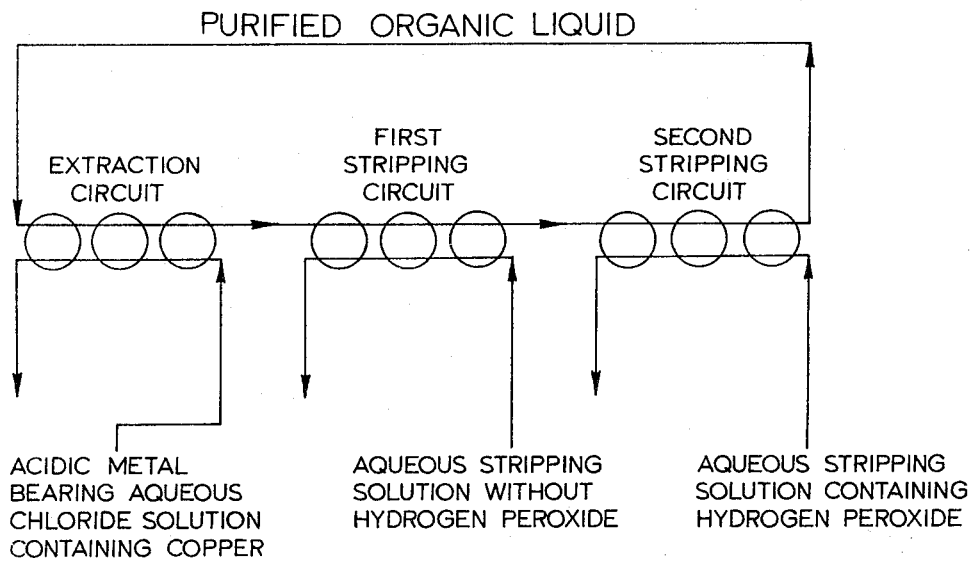
FIG. 2 shows another flowsheet illustrating a modification of the process of FIG. 1 that is within the scope of the invention.

The flowsheet of FIG. 2 illustrates an alternative procedure within the scope of the invention. In this case the copper-bearing organic liquid is brought into contact in a three-stage counter-current stripping circuit with a first aqueous stripping solution that does not contain hydrogen peroxide or any other peroxide. Stripping of the copper is therefore not necessarily complete and the copper-depleted solvent can thus retain residual copper. The copper-depleted solvent is then brought into contact in another three-stage counter-current stripping circuit with an aqueous solution that does contain hydrogen peroxide. Residual copper is thereby stripped from the solvent and the cleaned solvent is returned to the extraction circuit as in the procedure illustrated in FIG. 1.

The choice of whether the peroxide is in the first or subsequent aqueous stripping solutions depends on whether metal ions other than copper, that might also be accumulated in the organic liquid and might be stripped therefrom by the action of the peroxide, could be tolerated in the first aqueous stripping solution, in which the majority of the copper is present. If not, then an alternative such as that illustrated by the flowsheet of FIG. 2 is indicated.

While continuous treatment of the organic liquid with peroxide is advantageous in those cases in which a tendency is observed for residual concentrations of copper to accumulate theerin, it is by no means essential to the successful practice of the invention. Residual metal can be permitted to accumulate and then be eliminated periodically by occasional washing with the peroxide solution.

Since peroxides are well known oxidants it might be thought that their function in the present application is one of mere oxidation thereby implying the presence of cuprous ions in the organic solution that become oxidized according to a reaction such as, in the case of hydrogen peroxide:

$$Cu_2Cl_2 + H_2O_2 + 2HCl \rightarrow 2CuCl_2 + 2H_2O \quad (1)$$

This thought implies further that copper is extracted into the organic liquid in both the cuprous and the cupric state but that cupric copper is stripped therefrom more readily by dilute aqueous solutions, thereby leaving behind a residual copper concentration of cuprous ions.

Whether the latter implication is true or not the behaviour of peroxide in the present instance does not conform to the obvious mechanism suggested above, and is in fact unknown. Surprisingly it has been found that copper is removed from the organic liquid by contact with much less peroxide than the stoichiometric requirement of the above reaction and furthermore that dilute concentrations of peroxide in the aqueous stripping solution are more effective than more concentrated solutions in the removal of copper from the organic solvent provided, of course, that the absolute quantity of peroxide is sufficient to remove a substantial proportion of the copper. These phenomena are illustrated in Table 1 by data obtained from shake-out tests in the laboratory using hydrogen peroxide.

TABLE 1.—$H_2O_2$ REQUIREMENT, EXPRESSED AS A PERCENTAGE OF THE STOICHIOMETRIC REQUIREMENT FOR REACTION 1, TO REMOVE VARIOUS PROPORTIONS OF RESIDUAL COPPER INTO SOLUTIONS OF VARIOUS $H_2O_2$ CONCENTRATIONS

| | Proportion of copper removed, percent | | |
|---|---|---|---|
| | 50 | 70 | 90 |
| | Percent of stoichiometric $H_2O_2$ | | |
| $H_2O_2$ concentration, wt. percent: | | | |
| 0.5 | 45 | 70 | |
| 0.25 | 30 | 43 | 70 |
| 0.125 | 24 | 33 | 50 |

A copper-fouled organic liquid of 10% TIOA dissolved in Solvesso 150 as a suitable organic carrier contained 850 mg./l. of copper. Uniform quantities of this organic liquid were contacted with aqueous solutions containing $H_2O_2$ at concentrations as shown in the above table and at a variety of organic to aqueous ratios to provide data for a range of Cu to $H_2O_2$ ratios. No precipitates were formed on shaking and the two phases separated cleanly on settling. The organic was then analyzed for Cu to determine the degree of copper removal and the above data indicate those conditions under which the amount of $H_2O_2$ contacted was less than that required according to the stoichiometry of reaction 1 to account for the degree of copper removal achieved.

Thus while 70% of the copper was removed in a 0.5% $H_2O_2$ solution containing 70% of the stoichiometric amount of $H_2O_2$ required for 100% removal of Cu according to reaction 1, 90% of the copper was removed in a 0.125% $H_2O_2$ solution containing only 50% of the stoichiometric amount of $H_2O_2$ required for 100% Cu removal on the same basis. These results are surprising for two reasons, not only because the effectiveness of the $H_2O_2$ in removing copper from the organic solution varies inversely rather than directly with its concentration but also because the mechanism of its function is apparently not mere oxidation of cuprous copper according to reaction 1 as might have ben expected.

Further illustrations of the practice of this invention are provided in the following examples.

Example 1

An acidic aqueous chloride solution containing mainly nickel, cobalt, copper and hydrochloric acid was brought into contact with TIOA dissolved in Solvesso 150 in a continuous counter-current system, cobalt and copper were preferentially extracted together with hydrochloric acid and minor quantities of nickel and other metals such as iron and zinc, nickel was stripped from the TIOA in a concentrated hydrochloric acid solution, copper was stripped in a subsequent water stripping solution, and the TIOA containing residual copper and other metals was recirculated to the extraction circuit. After some time, the copper and other residual metals had accumulated to such as extent that about 30% of the extractive capacity of the TIOA was unavailable for extraction of fresh quantities of metal. A period followed in which the TIOA was treated with water after the copper-stripping stage, and subsequently the water treatment was replaced by a similar treatment with water containing 0.4% $H_2O_2$. The average concentrations of copper in the organic at the end of each period are shown in Table 2.

TABLE 2

Effect of various purification treatments on residual copper content of TIOA

| Name and duration of treatment: | Cu concentrations [1] |
|---|---|
| Before purification | 700 |
| $H_2O$ alone, 3 days | 460 |
| $H_2O_2$ solutions, 3 days | 2 |

[1] At end of each period, mg./l.

It is clear from the table that while only a portion of the copper was removed by washing with water alone, the copper was substantially completely removed by treatment with the peroxide solution.

The results indicate that the concentrations of copper can be maintained at low levels advantageously by the presence of a small concentration of a soluble peroxide in an aqueous stripping solution. Under these circumstances the organic liquid can be recycled continuously with high extractive capacity for copper and other metals from the acidic aqueous chloride solution.

Example 2

A series of tests was made to investigate the effectiveness of hydrogen peroxide in cleaning and regenerating copper-fouled amines other than TIOA. Various solvents were mixed with Solvesso 100 to make organic liquids containing 10% solvent and each was treated with a hydrochloric acid solution containing cuprous chloride. Each resulting copper-bearing organic liquid was then stripped with water to simulate copper stripping in practice and was then divided into two equal parts of 250 cc. each. One part was brought into contact with three 100 cc. lots of water in succession and the other part with three 100 cc. lots of water containing 0.3% $H_2O_2$. The effectiveness of water alone and of water containing $H_2O_2$ in removing residual copper from these organic liquids is contrasted in Table 3.

TABLE 4.—EFFECT OF VARIOUS AQUEOUS SOLUTIONS ON REGENERATION OF FOULED TIOA

| 8.5% TIOA dissolved in Solvesso 100 | Cu concentrations in organic liquid before and after treatment, mg./l. | |
|---|---|---|
| | Series 1 | Series 2 |
| Before purification | 125 | 17 |
| After wash with water | 106 | 9.7 |
| After wash with water having 0.3% $H_2O_2$ | 1.6 | 1.3 |
| After wash with water having 6.9 g.p.l. $Na_2O_2$ | 1.4 | 2.5 |

The results indicate not only that the purified organic liquid was substantially copper-free but also that the sodium peroxide solution was substantially as effective for copper removal as was the hydrogen peroxide solution. Thus it is reasonable to suggest that any water-soluble peroxide would be similarly effective in the removal of copper although hydrogen and sodium peroxide are the only two that would likely be used commercially.

While the organic carrier liquids that have been used most extensively in the present work are Solvesso 100 and 150, the method is not limited to these carriers. Testwork has shown that the carrier acts only as a diluent and does not affect the equilibria between the organic solvent and aqueous phases.

In solvent extraction systems such as the present one, which employ mixer-settler equipment, the most suitable carriers for amine solvents are aromatics such as methyl benzenes (xylenes) and their derivatives. Some chlorinated hydrocarbons could also be used. Aliphatic carriers such as kerosene would be satisfactory as far as the effect of peroxide on the regeneration of dissolved amine solvents is concerned, but they form a second organic phase after heavy loading and therefore are not suitable for use with mixer-settler equipment. In general any carrier should be satisfactory in the present and similar systems if it is substantially immiscible in water and forms only one

TABLE 3.—EFFECT OF WATER AND $H_2O_2$ SOLUTIONS ON PURIFICATION OF AMINES FOULED WITH COPPER

| | Solvent | | No. of C atoms in R groups * | | Percent removal of residual copper | |
|---|---|---|---|---|---|---|
| Classification of amine | Identifying trademark | Chemical name | Individual | Total | In $H_2O$ alone | In $H_2O_2$ solution |
| Secondary | Amberlite LA1 | N-dodecenyl (trialkyl methyl) amine | 12, 12–15 | 24–27 | 33.0 | 98.8 |
| | Amberlite LA2 | N-lauryl (tri alkylmethyl) amine | 12, 13–16 | 25–28 | 22.5 | 70.0 |
| Tertiary | Alamine 336 | Tri caprylyl amine | 8–12 | 24–36 | 25.1 | 99.1 |
| | Adogen 381 | Tri iso-octyl amine | 8 | 24 | 27.7 | 89.7 |
| Quaternary | Aliquat 336 | Tri caprylyl monomethyl ammonium chloride | 1, 8–12 | 25–37 | 14.6 | 37.5 |
| | Aliquat 336 | Tri caprylyl methyl ammonium chloride | 1, 8–12 | 25–37 | 9.9 | 47.4 |

* For the purposes of this specification secondary, tertiary, and quaternary amines such as those shown above are schematically represented by the general formulae

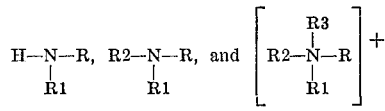

respectively. To be useful as solvents in solvent extraction each R, R1, R2 and R3 group should contain between 1 and about 20 carbon atoms and the total number of carbon atoms in the amine should be between about 8 and about 40. With fewer than about 8 carbon atoms losses of solvent by dissolution in aqueous solutions can be excessive and with more than about 40 carbon stoms the solvent is generally too viscous to permit ready separation from the aqueous solution with which it is in contact. Within these limits, however, the R, R1, R2 and R3 groups in any given solvent can be alike or different, straight or branched chain, saturated or unsaturated and may be alkyl, aryl, alkaryl or aralkyl. It is clearly demonstrated that water containing hydrogen peroxide is much more effective than water alone in the regeneration of all the amines and that these peroxide solutions are particularly suited to the treatment of secondary and tertiary amines.

EXAMPLE 3

Other tests were performed to compare the effect of sodium paroxide solutions with those of hydrogen peroxide. The organic liquid was an 8.5% solution of TIOA in Solvesso 100. A 350 cc. lot of this liquid containing residual copper, was given three successive washes with 100 cc. lots of a given aqueous solution. The initial and final Cu concentrations in the organic liquid are shown in Table 4.

organic phase under the operating conditions of the process.

Thus a convenient, inexpensive and highly effective means is described for the purification of amines that are cycled continuously in the solvent extraction of metals from acidic aqueous chloride solutions containing anionic chloride complexes and become fouled by the accumulation of metals therein, particularly copper, that are not completely stripped therefrom by aqueous solutions.

What I claim as my invention is:

1. In the method of treating an acidic metal-bearing aqueous chloride solution, containing copper anionic chloride complex, for removal of copper therefrom comprising bringing the solution into contact with an amine solvent for copper anionic chloride complex dissolved in a substantially water-immiscible organic carrier liquid, said amine being selected from the group secondary, tertiary, and quaternary amines of the general formulae,

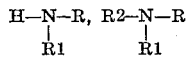

and

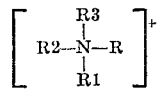

respectively, in which each R, R1, R2, and R3 group is selected from the group alkyl, aryl, aralkyl and alkaryl and contains from one to about twenty carbon atoms, and each amine contains a total number of from about eight to about forty carbon atoms, extracting copper into the solvent, separating the organic liquid containing the copper-bearing solvent from the aqueous solution, bringing the separated copper-bearing solvent into contact with an aqueous stripping solution, stripping copper into the stripping solution thereby depleting the solvent of copper, separating the organic liquid containing the solvent from the stripping solution, and reusing the copper-depleted solvent for treating fresh quantities of the acidic metal-bearing aqueous chloride solution, the improvement in stripping the solvent of copper comprising bringing copper-bearing solvent into contact with an aqueous stripping solution having a peroxide selected from the group hydrogen peroxide and sodium peroxide dissolved therein.

2. Method according to claim 1 in which only one aqueous stripping solution is used.

3. A method according to claim 1 in which at least two aqueous stripping solutions are used and peroxide is present in at least the second stripping solution.

4. A method according to claim 1 in which the solvent is tri-iso-octyl-amine.

5. A method according to claim 1 in which the peroxide is hydrogen peroxide.

6. A method according to claim 5 in which the molar ratio of hydrogen peroxide in aqueous stripping solution to copper in copper-bearing solvent in contact therewith is less than 0.5.

7. A method according to claim 5 in which the concentration of hydrogen peroxide in aqueous stripping solution is between about 0.1 and about 0.5%.

References Cited

UNITED STATES PATENTS

| | | | |
|---|---|---|---|
| 3,194,652 | 7/1965 | Clifford | 23—297 X |
| 3,337,296 | 8/1967 | Hill | 23—97 |
| 3,429,694 | 2/1969 | Lower | 75—117 |

FOREIGN PATENTS

| | | |
|---|---|---|
| 69,605 | 5/1969 | Germany. |

NORMAN YUDKOFF, Primary Examiner

S. J. EMERY, Assistant Examiner

U.S. Cl. X.R.

23—97, 147; 75—117